United States Patent
Bao et al.

(10) Patent No.: US 9,677,891 B2
(45) Date of Patent: Jun. 13, 2017

(54) POSITIONING, AND ENCODED LABEL GENERATING

(71) Applicant: International Business Machines Corporation, Armonk, NY (US)

(72) Inventors: Sheng Hua Bao, Beijing (CN); Jian Chen, Beijing (CN); Zhong Su, Beijing (CN); Li Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 14/224,542

(22) Filed: Mar. 25, 2014

(65) Prior Publication Data

US 2014/0291389 A1    Oct. 2, 2014

(30) Foreign Application Priority Data

Mar. 29, 2013    (CN) .......................... 2013 1 0106516

(51) Int. Cl.
*G01C 21/20* (2006.01)
*G09B 29/10* (2006.01)
*G09B 29/00* (2006.01)

(52) U.S. Cl.
CPC ......... *G01C 21/206* (2013.01); *G09B 29/007* (2013.01); *G09B 29/106* (2013.01)

(58) Field of Classification Search
USPC ....................................................... 235/375
See application file for complete search history.

(56) References Cited

U.S. PATENT DOCUMENTS 7,292,937 B2 * 11/2007 Kuroda ................ G01C 21/362
                                                              701/461
7,940,171 B2    5/2011 Sahuguet
(Continued)

FOREIGN PATENT DOCUMENTS

CN    1576787 A    2/2005
CN    1771426 A    5/2006
(Continued)

OTHER PUBLICATIONS

Mulloni et al., Indoor Positiong and Navigation with Camera Phones, Pervasive Computing Apr.-Jun. 2009, p. 22-31, IEEE CS.
(Continued)

*Primary Examiner* — Michael G Lee
*Assistant Examiner* — David Tardif
(74) *Attorney, Agent, or Firm* — David Quinn

(57) ABSTRACT

Embodiments of the present invention relate to a positioning method and a system thereof, an encoded label generating method and a system thereof. The present invention sets forth a solution of using encoded label to determine coordinate, so as to perform positioning. The positioning method, includes: acquiring a normalized map and a first identification code for identifying the map; acquiring, by scanning a first encoded label, a second identification code and a first coordinate indicated by the first encoded label; and determining a first location in the map corresponding to the first coordinate in response to the second identification code matching with the first identification code.

12 Claims, 6 Drawing Sheets

(56) References Cited

U.S. PATENT DOCUMENTS

| | | | |
|---|---|---|---|
| 8,624,725 B1* | 1/2014 | MacGregor | H04W 4/026 340/539.13 |
| 2009/0112815 A1* | 4/2009 | Antognini | G06F 17/30873 |
| 2012/0176491 A1* | 7/2012 | Garin | G01S 19/49 348/113 |
| 2014/0002605 A1* | 1/2014 | Liao | G06T 5/005 348/46 |

FOREIGN PATENT DOCUMENTS

| | | |
|---|---|---|
| CN | 101430203 A | 5/2009 |
| CN | 101666656 A | 3/2010 |
| CN | 101750083 A | 6/2010 |
| CN | 102384745 A | 3/2012 |
| CN | 102472628 A | 5/2012 |
| CN | 102506851 A | 6/2012 |
| CN | 102589542 A | 7/2012 |
| CN | 102736060 A | 10/2012 |
| CN | 102915310 A | 2/2013 |
| CN | 102937452 A | 2/2013 |

OTHER PUBLICATIONS

Parking Management and Development Office, Tapei City, to Find Car Location by Scanning the QR Code, Tapei City Government 2009, Updated Dec. 6, 2012 18:24:09.

* cited by examiner

POSITIONING, AND ENCODED LABEL GENERATING

CROSS-REFERENCE TO RELATED APPLICATION

This application claims priority under 35 U.S.C. §119 from Chinese Patent Application No. 201310106516.X filed Mar. 29, 2013, the entire contents of which are incorporated herein by reference.

BACKGROUND OF THE INVENTION

Field of the Invention

Embodiments of the present invention generally relate to map positioning, and more specifically, to a positioning method and a system thereof, an encoded label generating method and a system thereof.

Description of Related Art

With continuous development of urban infrastructure, people's demand for precise positioning is ever increasing. In most public facilities such as airport hall, museum, shopping mall, underground park etc, people wish to precisely determine their location. Currently, in these large public facilities, maps are often provided at multiple locations and current location will be indicated for users to easily determine their location. However, this approach is not only expensive in implementation, but also not convenient for people to determine their location whenever necessary. GPS is currently the most popular positioning technology. GPS (Global Positioning System) is a satellite navigation based positioning system, with which user may realize all-weather, continuous, and real-time 3-dimensional positioning and speed measuring worldwide. Although GPS technology has been developed into a relatively mature industrial application in terms of outdoor positioning, when a GPS receiver works indoor, wireless signals from satellite are greatly attenuated due to impact of buildings, the GPS receiver can not receive sufficient satellite signal, so that indoor positioning can not be realized. Further, even at outdoor, if a user is not carrying a GPS positioning device (such as a handset capable of conducting GPS positioning), the user is unable to conduct GPS positioning. In order to solve the problem that GPS can not realize precise indoor positioning, many people set forth alternative solutions, including using signals such as RFID (Radio Frequency Identification), Infrared, WiFi, Ultra Wideband etc to conduct positioning. However, implementation cost of these positioning technologies are relatively high, for example, special signal transmitting devices need to be installed in a shopping mall, and requirement on user side is also relatively high, a user must hold a dedicated terminal to receive wireless signal.

SUMMARY OF THE INVENTION

In order to solve the problem in the art, inventor of the invention has inventively set forth a solution of using an encoded label to determine coordinate, so as to conduct positioning.

There is provided a positioning method, including: acquiring a normalized map and a first identification code for identifying the map; acquiring, by scanning a first encoded label, a second identification code and a first coordinate indicated by the first encoded label; and determining a first location in the map corresponding to the first coordinate in response to the second identification code matching with the first identification code.

There is also provided a method for generating an encoded label, including: acquiring a normalized map and a first identification code for identifying the map; receiving entry of a first location in the normalized map; calculating coordinate of the first location; and encoding the first identification code and coordinate of the first location to generate the first encoded label in the above positioning method.

There is also provided a positioning system, including: a first acquiring means configured to acquire a normalized map and a first identification code for identifying the map; a second acquiring means configured to acquire, by scanning a first encoded label, a second identification code and a first coordinate indicated by the first encoded label; and a first determining means configured to determine a first location in the map corresponding to the first coordinate in response to the second identification code matching with the first identification code.

There is also provided a system for generating an encoded label, including: a third acquiring means configured to acquire a normalized map and a first identification code for identifying the map; a second receiving means configured to receive entry of a first location in the normalized map; a calculating means configured to calculate coordinate of the first location; and an encoding means configured to encode the first identification code and coordinate of the first location to generate the first encoded label in the above positioning system.

According to an embodiment of the invention, in case that there is no GPS signal, no network and no wireless signal, a user can conduct positioning by only using a simple application. Further, implementation cost of the invention is lower, as compared to those technologies that require GPS signal or other wireless signals to conduct positioning, and a map distributor (such as store or museum etc) enables a user to conduct positioning by simply printing out several encoded labels.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art. Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
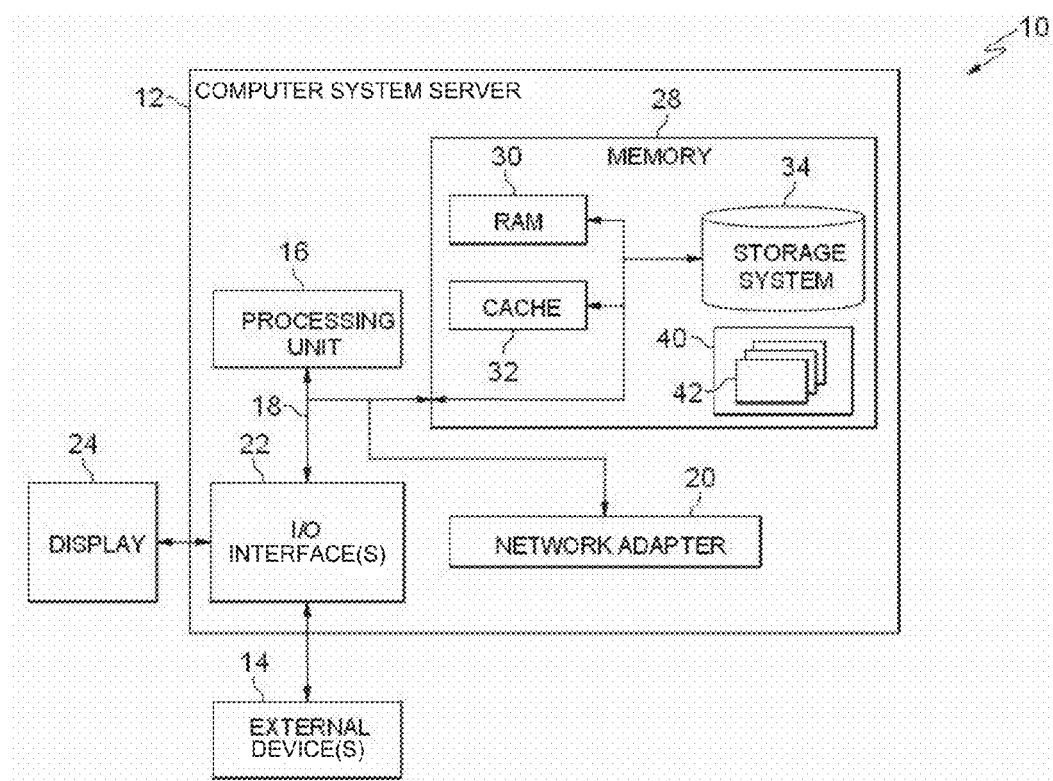
FIG. 1 shows a diagram of an exemplary computer system 100 which is applicable to implement the embodiments of the present invention.

FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a block diagram of an exemplary computer system/server 12 which is applicable to implement the embodiments of the present invention is shown. Computer system/server 12 as shown in FIG. 1 is only illustrative and is not directed to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention suggests using an encoded label to determine coordinate, so as to conduct positioning on a map. In an illustrative application scenario of the present invention, a user in a museum needs to determine his/her location. Then, the user shoots a look-down map of certain floor in the museum at entrance of the museum, and when the user moves to certain exhibition room of the museum, he/she scans a 2-dimensional encoded label posted at entrance of that exhibition room with his/her mobile phone. This 2-dimensional encoded label contains therein coordinate information of location of that exhibition room. Current location of the user can be identified on the map by positioning that coordinate in the map.

Figure 2:
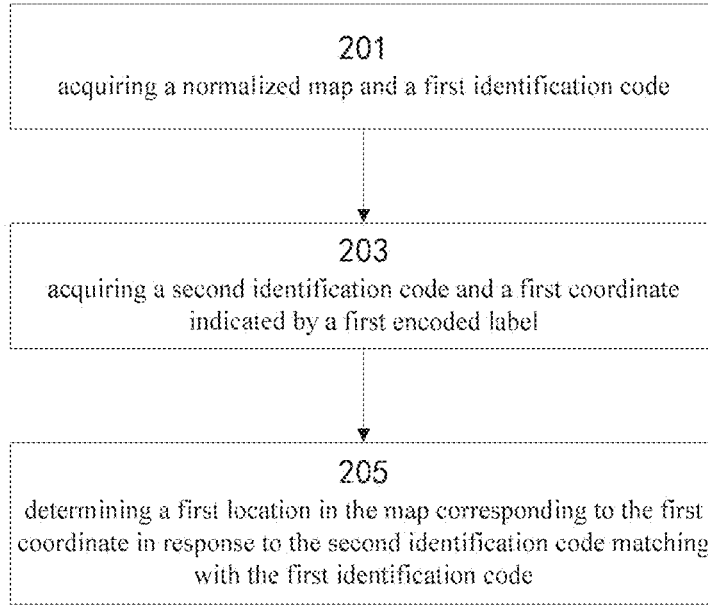
FIG. 2 shows a flowchart of a positioning method according to an embodiment of the present invention.

FIG. 2 shows a flowchart of a positioning method according to an embodiment of the present invention. In step 201, acquiring a normalized map and a first identification code for identifying the map.

Wherein, the normalized map represents that edges and direction of that map have been determined. The procedure of normalizing a map is to determine edges and direction of the map in accordance with a unified rule. FIG. 3C shows a diagram of a normalized map according to an embodiment of the present invention. In the map of FIG. 3C, edges of the map have been determined by four right angle sides, and direction of the map has been determined by a solid arrow (the solid arrow points to west). The procedure of normalizing a map will be described below in detail.

The first identification code is used to identify the map. The first identification code may contain at least one of: number, alphabet, character, text, or other encode element. The first identification code can either be formed by a string of randomly generated numbers, or may comprise a series of meaningful characters, such as postal code of a region and name of a building or name of a company, etc.

The normalized map and the first identification code may be acquired in various ways. For example, the normalized map may be acquired by shooting a map posted in the museum (the map may be posted at entrance of the museum, at entrance of various stairs, at entrance of elevators or at other obvious locations) and conducting normalization on the map; also, the normalized map may be acquired by downloading the map from network in advance. Further, if capacity of the map is small enough, the normalized map may even be acquired by scanning an encoded label; of course, the normalized map may also be acquired through other manners.

According to an embodiment of the present invention, different maps have different identification codes, through these identification codes, it can be known an encoded label scanned in a subsequent step corresponds to a location in which map. For example, user's mobile phone may store therein a plurality of maps, and when scanning the first encoded label, a matching map can be automatically determined from the stored maps.

In step 203, acquiring, by scanning a first encoded label, a second identification code and a first coordinate indicated by the first encoded label. The first encoded label may comprise various code types, such as 1-dimensional code, 2-dimensional code, etc. The first encoded label may, for example, be posted at doorpost, doorcase of entrance of an exhibition room or at any other desired location. By scanning the first encoded label, user can decode and acquire a second identification code indicated by the first encoded label and a first coordinate. The second identification code is used to identify the map. The second identification code may contain at least one of: number, alphabet, character, text. The second identification code can either be formed by a string of randomly generated numbers, or may comprise a series of meaningful characters, such as postal code of a region and name of a building or name of a company, etc.

The first coordinate represents coordinate of current location in the map, and may be represented in various manners, such as XY coordinate, radian coordinate, etc. If a user acquires the map by shooting, it is very likely that the map acquired by the user will have different size. Thus, to be able to accurately indicate coordinate of a location in the map, the location can be identified by relative coordinate. For example, for a map of 10 cm*10 cm, instead of using X=5 cm, Y=5 cm to identify centre of the map, the center is identified by using X=50%, Y=50%.

In the example of museum, the museum needs to determine location of each exhibition room in the map in advance, then encode this location to generate a first encoded label and post it outside of corresponding exhibition room. Many existing software are provided with functionality of scanning and decoding an encoded label; according to an embodiment of the present invention, the positioning method may utilize an existing encoded label scanning application to scan the encoded label to acquire encoded content; according to another embodiment of the present invention, the positioning method may comprise scanning feature of the encoded label.

In step 205, determining a first location in the map corresponding to the first coordinate in response to the second identification code matching with the first identification code. The matching of the second identification code with the first identification code means that the location indicated by the scanned first encoded label is just the location in the map. Since a user may store a plurality of maps, what is needed first is to determine which map is the map indicated by the first encoded label. By taking FIG. 3C for example, assuming location of the five-pointed star is the first location, first coordinate indicated by the first encoded label posted at the first location is X=30%, Y=45%. In step 205, position of the first location in the map will be restored through the acquired first coordinate X=30%, Y=45%. User will know his/her current location by viewing the first location in the map.

Although in FIG. 2, steps 201, 203, 205 are described in sequence, those skilled in the art will appreciated that, step 201 can be performed in parallel with step 203, alternatively, step 201 can also be performed after step 203. For example, a user may first scan the first encoded label, and then acquire the map and the first identification code, which will not affect the implementation of the present invention.

An embodiment of acquiring a normalized map in step 201 will be described in detail below with reference to FIG. 3A-FIG. 3C. In this embodiment, first, a map to be normalized will be acquired, wherein, the map to be normalized contains therein flags indicating edges and direction of the map, the map to be normalized has not been normalized; then, normalization is performed on the map to be normalized to determine edges and direction of the map.

Figure 3A:
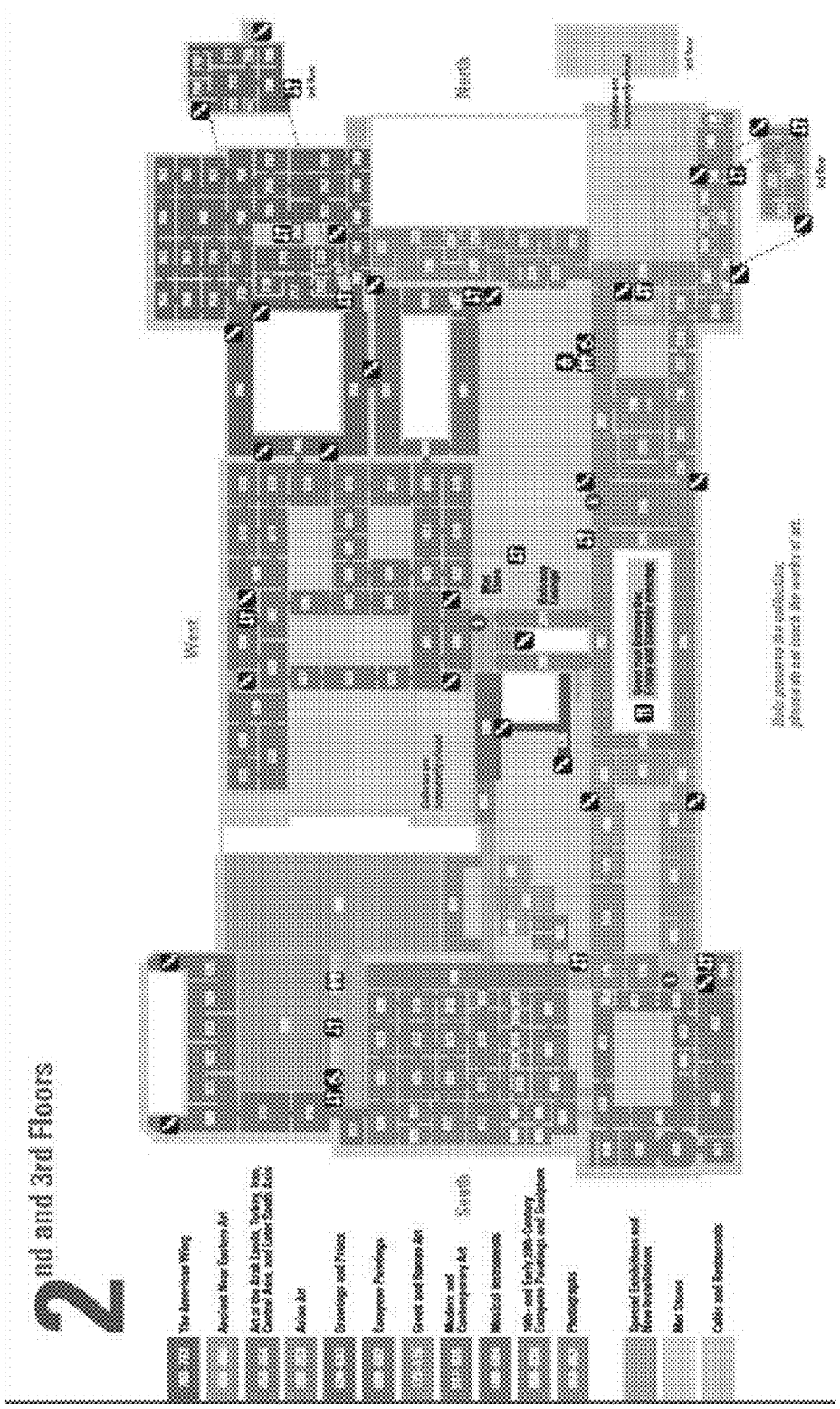
FIG. 3A shows a diagram of an existing map.
Figure 3B:
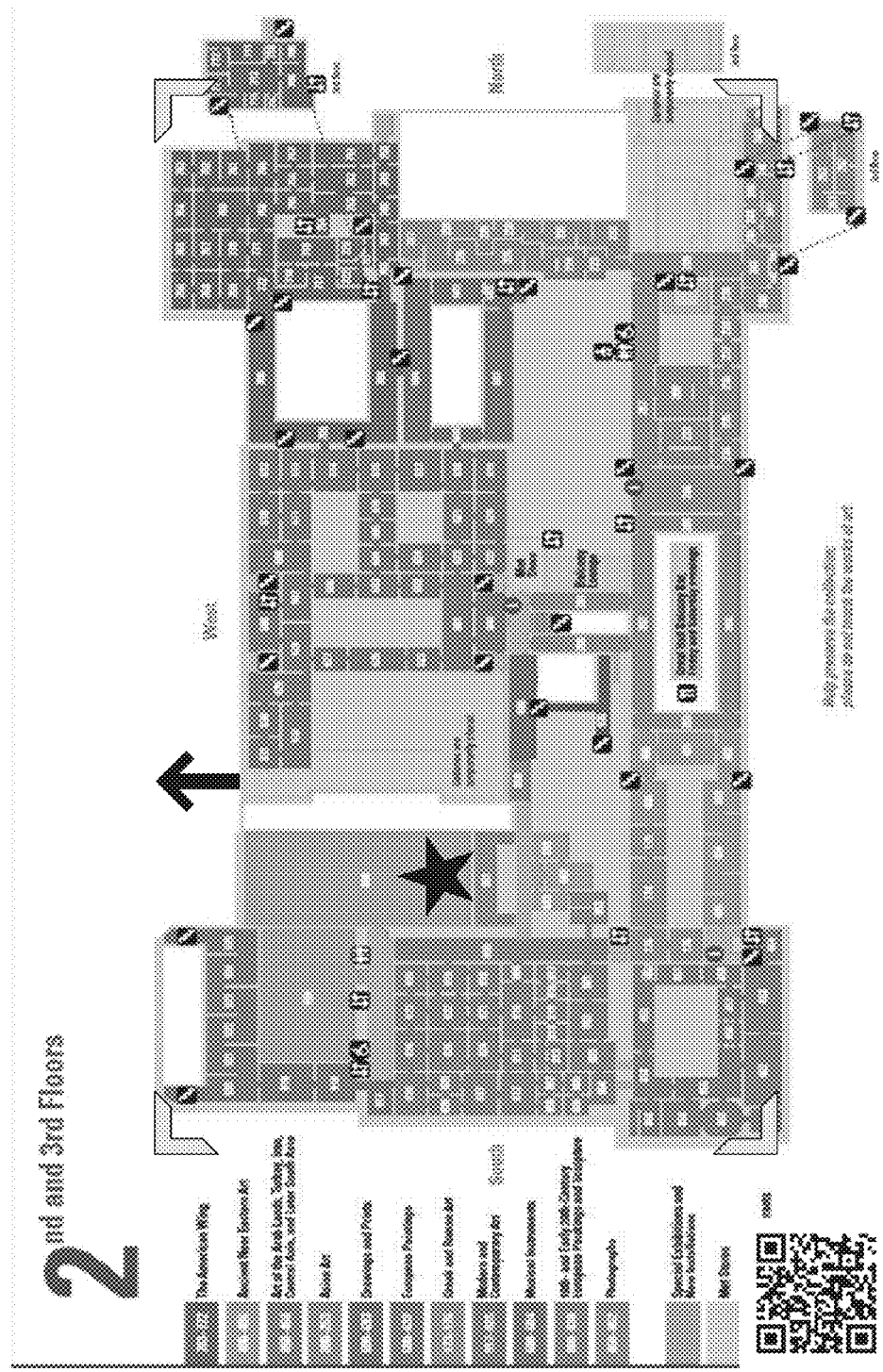
FIG. 3B shows a diagram of a map according to an embodiment of the present invention.
Figure 3C:
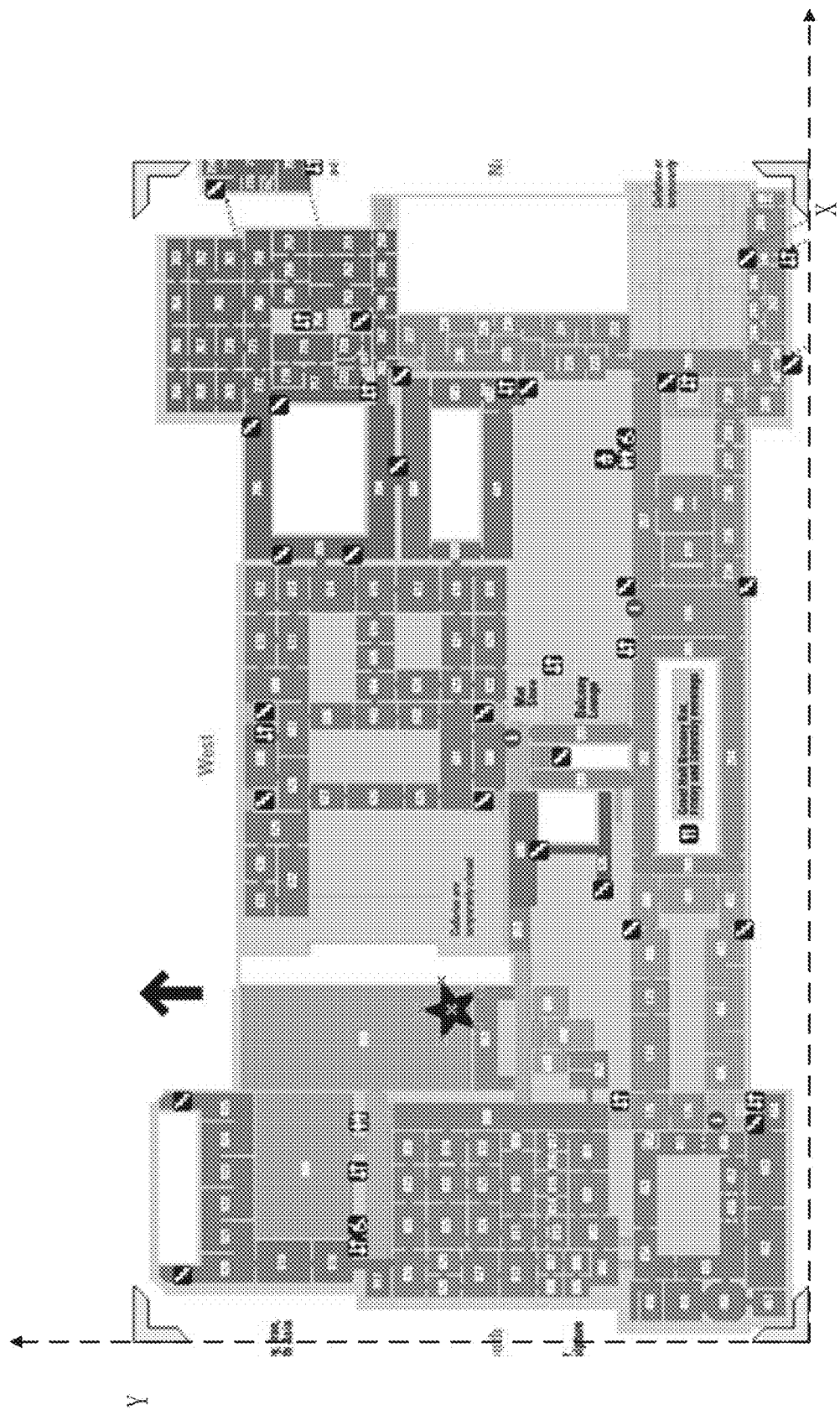
FIG. 3C shows a diagram of a normalized map according to an embodiment of the present invention.

Still taking a museum as an example for illustration, FIG. 3A shows a diagram of a planar map of an existing museum (the map originates from website of Metropolitan Museum of Art http://www.metmuseum.org/visit/museum-map). FIG. 3B is formed by indicating edges (represented by right-angle sides) and direction (represented by an arrow) on the map of FIG. 3A. FIG. 3B is the map to be normalized.

According to an embodiment of the present invention, the step of acquiring a map to be normalized further comprises: acquiring the map by shooting. If a user acquires the map to be normalized by shooting, maps acquired by user by shooting from different angle, different distance, and different position will have different size, direction, and distortion degree. Thus, subsequent positioning procedure can not be conducted if edges and direction of the map are not indicated.

Any flags capable of describing edges and direction of a map can be used, for example, edges of a map may be described by arranging flags at 2 opposite angles, 3 angles, 4 angles, even more points (e.g., 4 middle points on 4 sides of the map), or may be described by arranging flags at 1 side, 2 sides, 3 sides, 4 sides or more sides of the map, or may be described by arranging flags at both angles and sides of the map. The flags for describing edges and direction of a map may be separated (as shown in FIG. 3B), or be combined with each other (for example, curves are arranged on side toward north in the map, and straight lines are arranged on sides toward other direction in the map; alternatively, round angle is arranged on the northeast angle of the map, and right angle is arranged on the other 3 angles in the map). The flag may be represented by at least one of: pattern, number, alphabet (e.g., alphabet N may be used to represent north), character, text.

If the user acquires the map to be normalized by shooting, simple image processing technology may be further utilized to perform normalization on the map to be normalized, thereby determining its edge and direction. A normalized map refers to a map whose edges and direction have been determined. According to an embodiment of the present invention, a normalized map may reserve flags of edges and direction of the map (as shown in FIG. 3C); according to another embodiment of the present invention, a normalized map may remove flags of edges and direction of the map. It should be appreciated that, coordinate axes XY shown by dashed line in FIG. 3C are merely illustrative, and do not mean that coordinate axes have to be added in the map. According to an embodiment of the present invention, the normalized map may remove pattern outside of edges of the map (as shown in FIG. 3C); according to another embodiment of the present invention, the normalized map may reserve pattern outside of edges of the map. According to an embodiment of the present invention, the step of performing normalization on the map to determine its edges and direction further comprises correcting distortion resulted from shooting the map, and then determining edges and direction of the corrected map.

According to an embodiment of the present invention, the step of acquiring a first identification code further comprises: acquiring, by scanning a second encoded label, the first identification code indicated by the second encoded label. Thus, various advantages of an encoded label can be utilized, user does not have to memorize, enter or edit the complicated first identification code of the map, rather, user can acquire the first identification code by simply scanning the second encoded label. Similar to the first identification code, the second encoded label may also contain at least one of: 1-dimensional code, 2-dimensional code and other code. The encoding rule employed by the first encoded label may be consistent with or independent to that employed by the second encoded label. In one embodiment, the second encoded label may be included in the map to be normalized (as shown in left lower corner of FIG. 3B); in another embodiment, the second encoded label may be separated from the map to be normalized. If the map to be normalized is acquired by shooting and the second encoded label is included in the map to be normalized, then scanning of the second encoded label may be combined with the process of shooting the map, for example, the second encoded label is scanned during shooting of the map. Of course, in other embodiments, scanning of the second encoded label may be performed separately.

According to an embodiment of the present invention, the positioning method may further correlate the first location with time of acquiring the first encoded label. Further, the first location and the time of acquiring the first encoded label (e.g., time of scanning the first encoded label) may be simultaneously displayed in the map, alternatively, traveling track of the user may also be displayed in the map (for example, a line with arrow is used to describe a path of user from one location to another location). User may determine a location where he/she had been to through time, this will facilitate user in determining his/her traveling track or returning to the location where he/she had been to. Taking a parking structure for example, if user's parking location (i.e. first location) and time are recorded, it will help the user to return from current location to original parking location.

According to an embodiment of the present invention, the positioning method may further comprise: receiving a destination location; and determining a path from the first location to the destination location. In this embodiment, the positioning method may be further used for navigation. If all paths of a map are known, then an actual path to the destination location may be indicated in the map. For example, paths of a map may be provided by the map provider, e.g., the museum will indicated in the map which is an exhibition hall and which is a road. Further, as another example, all paths of a map may be acquired by performing image analysis on the map (e.g., all places that are in yellow are roads). If all paths of the map are not known, then the above step of determining a path may comprise: indicating in the map a straight line path to the destination location.

Figure 4:
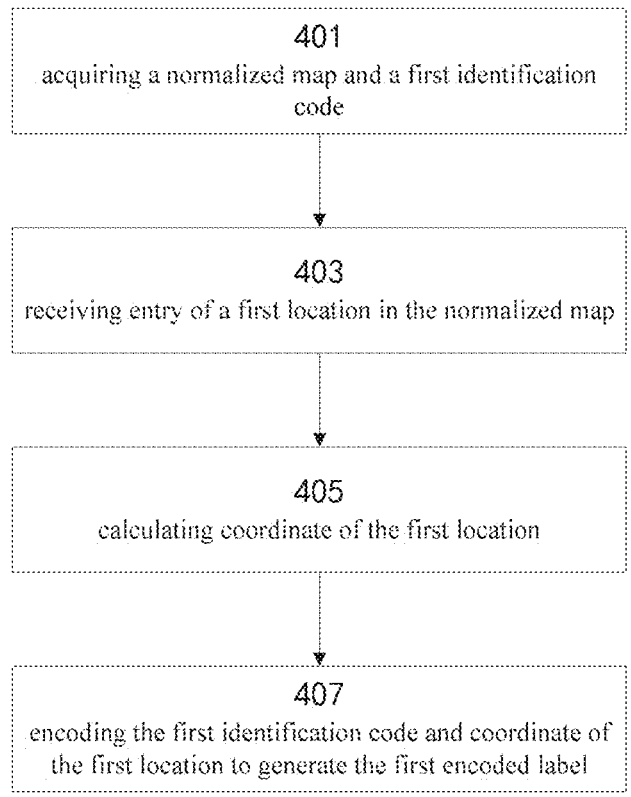
FIG. 4 shows a flowchart of an encoded label generating method according to an embodiment of the present invention.

FIG. 4 shows a flowchart of an encoded label generating method according to an embodiment of the present invention. The method may help the map provider (such as a museum) to generate a first encoded label in a simple way. In step 401, acquiring a normalized map and a first identification code for identifying the map. The normalized map and the first identification code here are the same as those above, and description of which will be omitted for brevity.

In step 403, receiving entry of a first location in the normalized map. The entry may be at least one of: click, select through a check box, enter name or number of a first location (such as, enter number of an exhibition room) and other inputting manner. With this step, an encoded label may be generated in a simple way. For example, if a user wants to print out an encoded label of an exhibition room, the user just needs to directly click on location of the corresponding exhibition room in the map.

In step 405, calculating coordinate of the first location. Since the normalized map has been acquired in step 401, coordinate of the first location on the normalized map may be calculated in step 405. As stated above, the coordinate may be represented in various manners, such as, XY coordinates, radian coordinates.

In step 407, encoding the first identification code and coordinate of the first location to generate the first encoded label. The first encoded label is used to identify coordinate of the first location in the map and the first identification code of the map. Through operations of these several steps, an encoded label can be simply generated for the first location to be posted at the first location.

According to an embodiment of the present invention, acquiring a normalized map in step 401 further comprises: acquiring a map to be normalized; and performing normalization on the map to be normalized to label edges and direction of the map according to user's indication. For example, user identifies 4 vertex angles of the map and sides or angles in a certain direction through clicking; as another example, user circles edges of the map and designates its direction on the map, etc.

In sum, the positioning method according to an embodiment of the present invention is capable of achieving at least one of the following beneficial effects: (1) cost saving, for example, in the above case, the museum does not need to deploy any device for receiving and transmitting wireless signal, rather, the museum only needs to prepare an encoded label for each exhibition room; (2) does not depend on transmission of wireless signal, what is needed is to provide at user side a device capable of scanning an encoded label, while most current intelligent mobile phones can realize scanning of an encoded label, thus, the present invention is applicable in any circumstances, even in an underground parking lot where wireless signal can not be received; (3) simple and easy to be implemented; there is no complex operation, rather, a user can determine his/her location by simply scanning a first encoded label. Of course, other embodiments of the present invention may further achieve other beneficial effects, which have been described hereinbefore and will be omitted for brevity.

The positioning method and encoded label generating method in the present invention have been described hereinabove, and a positioning system and an encoded label generating system under the same inventive concept will be described below with reference to FIG. 5 and FIG. 6, wherein same or corresponding implementation details will be omitted, since they have been described in detail and thoroughly hereinbefore.

Figure 5:
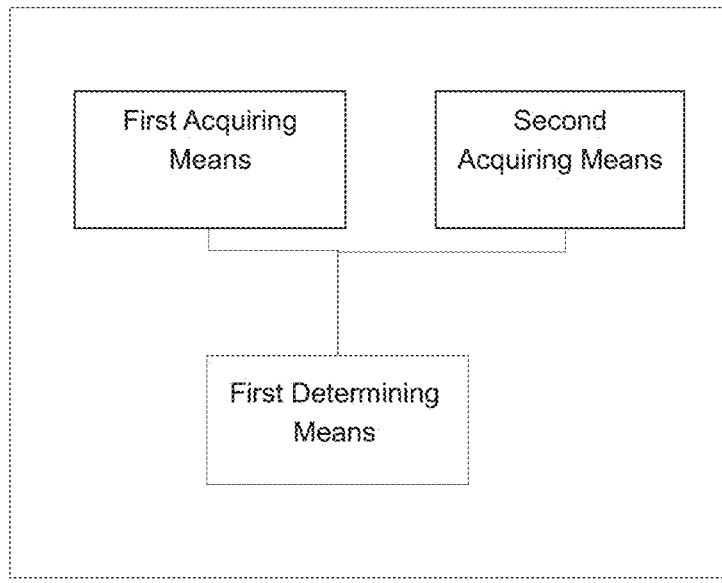
FIG. 5 shows a block diagram of a positioning system according to an embodiment of the present invention.

FIG. 5 shows a block diagram of a positioning system according to an embodiment of the present invention. The positioning system comprises a first acquiring means, a second acquiring means, and a first determining means. Wherein, the first acquiring means is configured to acquire a normalized map and a first identification code for identifying the map. The second acquiring means is configured to acquire, by scanning a first encoded label, a second identification code and a first coordinate indicated by the first encoded label. The first determining means is configured to determine a first location in the map corresponding to the first coordinate in response to the second identification code matching with the first identification code.

According to an embodiment of the present invention, the first acquiring means is further configured to: acquire a map to be normalized, wherein the map to be normalized contains therein flags indicating edges and direction of the map; and perform normalization on the map to be normalized to determine edges and direction of the map.

According to another embodiment of the present invention, wherein, the first acquiring means is further configured to: acquire the map to be normalized by shooting.

According to another embodiment of the present invention, wherein, the first acquiring means is further configured to: acquire, by scanning a second encoded label, the first identification code indicated by the second encoded label.

According to another embodiment of the present invention, the positioning system further comprises: a correlating means configured to correlate the first location with the time of acquiring the first encoded label.

According to another embodiment of the present invention, the positioning system further comprises: a first receiving means configured to receive a destination location; and a second determining means configured to determine a path from the first location to the destination location.

Figure 6:
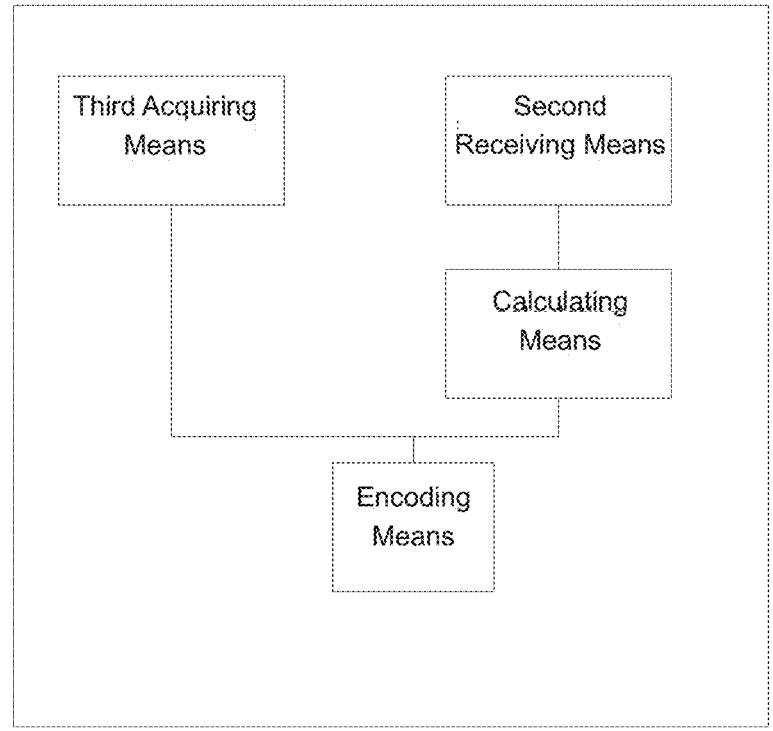
FIG. 6 shows a block diagram of an encoded label generating system according to an embodiment of the present invention.

FIG. 6 shows a block diagram of an encoded label generating system according to an embodiment of the present invention, for generating the first encoded label in the above positioning system. The system comprises a third acquiring means, a second receiving means, a calculating means and an encoding means. Wherein, the third acquiring means is configured to acquire a normalized map and a first identification code for identifying the map; the second receiving means is configured to receive entry of a first location in the normalized map; the calculating means is configured to calculate coordinate of the first location; and the encoding means is configured to encode the first identification code and coordinate of the first location to generate the first encoded label.

According to an embodiment of the present invention, the third acquiring means is further configured to: acquire a map to be normalized; and perform normalization on the map to be normalized to label edges and direction of the map according to user's indication.

The descriptions of the various embodiments of the present invention have been presented for purposes of illustration, but are not directed to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A positioning method, comprising:
    acquiring a map to be normalized by capturing an image of a posted map, wherein the map contains flags indicating edges and direction of the posted map;
    performing normalization on the posted map to generate a normalized map, wherein normalization comprises determining edges and direction of the normalized map based, at least in part, on the flags contained in the posted map;
    acquiring a first identification code that identifies the posted map;
    scanning a first encoded label located at a location other than a location of the posted map;
    determining a second identification code and a first coordinate based, at least in part, on the first encoded label; and
    determining a first location in the normalized map corresponding to the first coordinate in response to the second identification code matching with the first identification code.

2. The method according to claim 1, wherein, the step of acquiring the first identification code further comprises:
    acquiring, by scanning a second encoded label, the first identification code indicated by the second encoded label.

3. The method according to claim 1, further comprising:
    correlating the first location with the time of acquiring the first encoded label.

4. The method according to claim 1, further comprising:
    receiving a destination location; and
    determining a path from the first location to the destination location.

5. The method of claim 1, further comprising generating an encoded label, comprising:
    acquiring a normalized map and a first identification code for identifying the map;
    receiving entry of a first location in the normalized map;
    calculating coordinate of the first location; and
    encoding the first identification code and coordinate of the first location to generate the first encoded label.

6. The method according to claim 5, wherein, the step of acquiring a normalized map further comprises:
    acquiring a map to be normalized; and
    performing normalization on the map to be normalized to label edges and direction of the map according to user's indication.

7. A positioning system, comprising:
    an image capturing means configured to capture an image of a posted map, wherein the map contains flags indicating edges and direction of the posted map;
    a normalizing means configured to generate a normalized map by normalizing the posted map, wherein normalization comprises determining edges and direction of the normalized map based, at least in part, on the flags contained in the posted map;
    a first acquiring means configured to acquire a first identification code for identifying the map;
    a scanning means configured to scan a first encoded label located at a location other than a location of the posted map;
    a first determining means configured to determine a second identification code and a first coordinate based, at least in part, on the first encoded label;
    a second determining means configured to determine a first location in the normalized map corresponding to the first coordinate in response to the second identification code matching with the first identification code.

8. The system according to claim 7 wherein, the first acquiring means is further configured to:
    acquire, by scanning a second encoded label, the first identification code indicated by the second encoded label.

9. The system according to claim 7, further comprising:
    a correlating means configured to correlate the first location with the time of acquiring the first encoded label.

10. The system according to claim 7, further comprising:
a first receiving means configured to receive a destination location; and
a second determining means configured to determine a path from the first location to the destination location.

11. The system of claim 7, further comprising a label generating means for generating an encoded label, comprising:
a third acquiring means configured to acquire a normalized map and a first identification code for identifying the map;
a second receiving means configured to receive entry of a first location in the normalized map;
a calculating means configured to calculate coordinate of the first location; and
an encoding means configured to encode the first identification code and coordinate of the first location to generate the first encoded label.

12. The system according to claim 11, wherein, the third acquiring means is further configured to:
acquire a map to be normalized; and
perform normalization on the map to be normalized to label edges and direction of the map according to user's indication.

* * * * *